United States Patent [19]

Wilkinson et al.

[11] 4,403,807
[45] Sep. 13, 1983

[54] BABYSEAT ATTACHMENT FOR SHOPPING CART

[75] Inventors: Dawn G. Wilkinson, Rte. #1, Box 403, Fennville, Mich. 49408; John D. Brush, Casco Township, Allegan County, Mich.

[73] Assignee: Dawn G. Wilkinson, Fennville, Mich.

[21] Appl. No.: 192,168

[22] Filed: Sep. 30, 1980

[51] Int. Cl.³ .............................................. A47C 31/00
[52] U.S. Cl. ....................................... 297/217; 108/47; 224/42.46 R; 297/250
[58] Field of Search ............................... 297/217, 250; 280/33.99 B, 33.99 A; 108/44, 47; 224/42.46 R, 32 R, 33 A; 211/106

[56] References Cited

U.S. PATENT DOCUMENTS

| 657,135 | 9/1900 | Rothaermel | 224/33 A |
| 2,662,775 | 12/1953 | Goldman | 297/250 X |
| 2,770,513 | 11/1956 | Brown | 108/44 X |
| 3,351,380 | 11/1967 | Sprague | 280/33.99 B X |
| 3,353,836 | 11/1967 | Davis | 280/33.99 B |
| 3,995,803 | 12/1976 | Uitz | 224/33 A |

FOREIGN PATENT DOCUMENTS 850997 10/1960 United Kingdom ................ 211/106

Primary Examiner—William E. Lyddane
Attorney, Agent, or Firm—Flynn, Thiel, Boutell & Tanis

[57] ABSTRACT

A baby carrier construction is disclosed, including a seat assembly with four downwardly converging side walls, a bottom wall and a pair of horizontally spaced leg holes in one of the walls. A mounting assembly is provided on one side wall of the baby carrier and includes a leveling assembly having a bearing member spaced outwardly from the side wall and spacer elements extending between the side wall and bearing member to maintain the spaced relationship. The mounting assembly also includes a hook assembly provided at the top of the leveling assembly for detachably mounting the baby carrier to a shopping cart or similar wheel-supported vehicle. The leveling assembly is movable between a leveling position for maintaining the baby carrier in a substantially level disposition when mounted on a shopping cart, and a retracted position flushly disposed against the adjacent side wall for facilitating nested stacking of the baby carrier with one or more similar carriers.

10 Claims, 6 Drawing Figures

BABYSEAT ATTACHMENT FOR SHOPPING CART

FIELD OF THE INVENTION

This invention relates to a baby carrier and more particularly to a baby carrier which is detachably mountable to a shopping cart or similar wheel-supported vehicle.

BACKGROUND OF THE INVENTION

The provision of baby carriers on shopping carts is well known. Such carriers have proved popular with shoppers who would otherwise have to carry small children throughout the store or else place them in the basket of the shopping cart, thereby reducing the effective capacity of the cart to hold items to be purchased.

Many conventional shopping carts provide a baby carrier as an integral structural part of the cart, as is illustrated for example, in U.S. Pat. Nos. 4,116,456 and 3,350,136. These constructions have proved very satisfactory for their intended purpose, however, it is frequently the case that a shopper will have more than one child and would like to have a place in the cart to put the second child.

A detachable seat suitable for supporting a second child is disclosed in U.S. Pat. No. 3,353,836. Detachable child carriers of this type have adequately fulfilled their intended purposes, but have not proved entirely satisfactory in all respects. For example, the location of the carrier on the cart often makes its use somewhat awkward for both the shopper and the child. Further, such carriers often necessitate a modification of the cart to provide openings for the child's legs or to effect a secure attachment of the carrier to the cart.

Accordingly, it is an object of the present invention to provide a child carrier which may be detachably mounted to a shopping cart or similar wheel-supported vehicle at a location where the shopper may conveniently place the child or additional groceries in the carrier, such location preferably being at the front end of the cart.

A further object of the present invention is to provide a child carrier, as aforesaid, which is simple and inexpensive to manufacture, and can be stacked in a nested manner with similar units for storage.

A further object of the present invention is to provide a child carrier, as aforesaid, which does not necessitate structural modifications of the cart to which it is to be attached, and which is maintained in a substantially level disposition when detachably mounted to a sloping wall of a shopping cart.

SUMMARY OF THE INVENTION

The objects and purposes of the present invention, including those set forth above, are met by providing a baby carrier having a seat assembly with four downwardly converging side walls, a bottom wall and a pair of horizontally spaced leg holes in one of the walls. A mounting assembly is provided on one side wall of the baby carrier and includes a leveling assembly having a bearing member spaced outwardly from the side wall and spacer elements extending between the side wall and bearing members to maintain the spaced relationship. The mounting assembly also includes a hook assembly provided at the top of the leveling assembly for detachably mounting the baby carrier to a shopping cart or similar wheel-supported vehicle. The leveling assembly is movable between an extended leveling position transverse of the side wall for maintaining the baby carrier in a substantially level disposition when mounted on a shopping cart, and a retracted position disposed against the adjacent side wall in a parallel relationship thereto for facilitating nested stacking of the baby carrier with one or more similar carriers.

Figure 1:
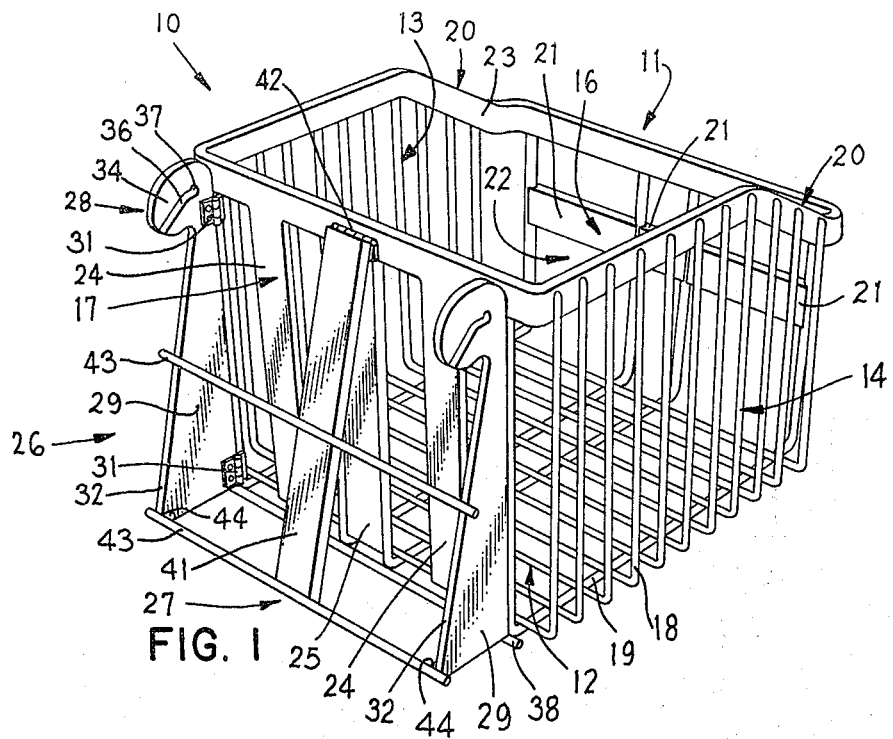
FIG. 1 is a perspective view of a baby carrier embodying the present invention.

Certain terminology will be used in the following description for convenience in reference only and will not be limiting. The words "upwardly" and "downwardly" will designate directions in the drawings to which reference is made. The words "inwardly" and "outwardly" will refer to directions toward and away from, respectively, the geometric center of the baby carrier and designated parts thereof. Such terminology will include the words mentioned, derivatives thereof and words of similar import.

DETAILED DESCRIPTION

Referring to FIG. 1, there is illustrated a baby carrier 10 for use in conjunction with a grocery cart or a similar wheel-supported vehicle. The baby carrier 10 has a seat assembly, designated generally by the reference numeral 11, which comprises a substantially horizontal bottom wall 12 and four side walls 13, 14, 16 and 17 which extend upwardly from the peripheral edges of the bottom wall 12. Each side wall 13, 14, 16 and 17 is angled slightly so that the side walls converge toward the bottom wall 12.

The seat assembly 11 is constructed from metal rods welded together to form a mesh basket. In the preferred embodiment in FIG. 1, there are plural, here eleven, U-shaped metal rods 18 arranged parallel to each other, such that the legs define the side walls 13 and 14 and the central portion connecting the legs defines the bottom wall 12. There are also plural, here four, U-shaped metal rods 19 arranged parallel to each other and extending transversely of the metal rods 18, such that the legs thereof define the side walls 16 and 17 and the central portions connecting the legs are just beneath the central portions of the metal rod 18. The rods 19 are spaced so that the distance between each outer rod and the adjacent rod is greater than the distance between the two centrally positioned rods. The rods 19 are preferably welded to the rods 18 at each intersection thereof in the bottom wall 12. The legs of the metal rods 19 which define the side wall 16 are shorter than the legs which define the side wall 17, such that side wall 16 is of lesser height than side wall 17. The legs of the metal rods 18 which are adjacent the side wall 16 are preferably of successively decreasing length so as to define a sloping portion 20 at the top of side walls 13 and 14 which compensates for the difference in height between side walls 16 and 17.

Figure 3:
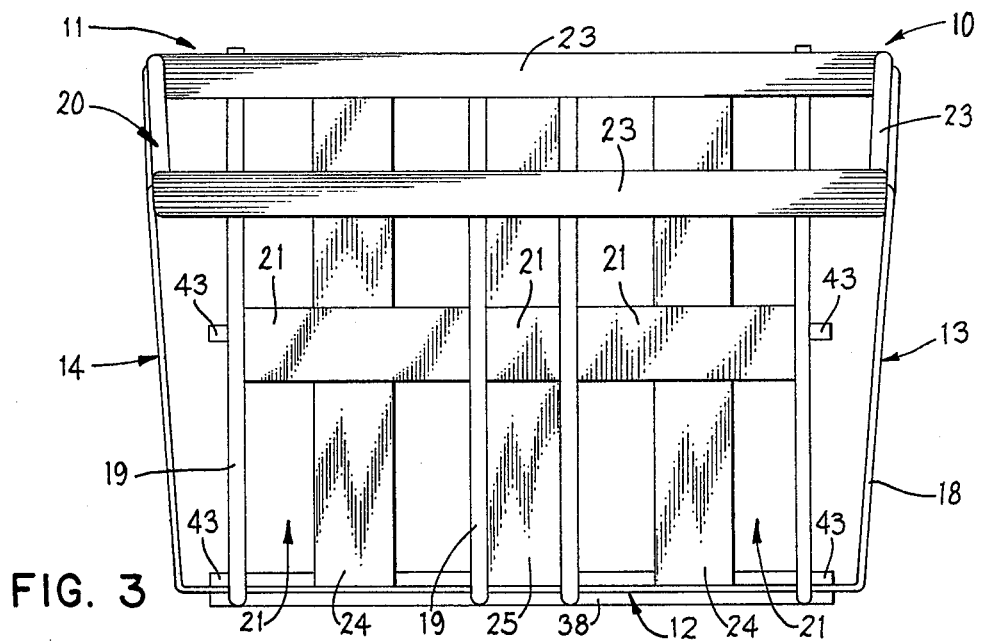
FIG. 3 is a side view of a different side of the baby carrier of FIG. 1.

The side walls 16 are further defined by plural, here three, horizontal cross-bars 21, each extending between pairs of adjacent U-shaped rods 19 and welded thereto. The cross-bars 21 are positioned approximately two-thirds of the distance up the side wall 16 so as to leave two horizontally spaced leg openings 22 (FIGS. 1 and 3), each of which is bounded by the bottom wall 12, a cross-bar 21, and a pair of adjacent U-shaped metal rods 19.

The top of the seat assembly 11 is defined by a metal rim 23 which extends along the tops of the side walls 13, 14, 16 and 17. The top of each leg of the U-shaped rods 18 and 19 is welded to the rim in order to hold the rim securely in place and to impart rigidity to the side walls 13, 14, 16 and 17. The side wall 17 is further defined by two laterally spaced bars 24 and a central bar 25 located between the bars 24, each extending downwardly from the bottom of the rim 23 to the edge of the bottom wall 12 therebelow. The bars 24 and 25 may be integral extensions of the rim 23, or may be separate components which are secured to the rim 23 by welds. The lower ends of the bars 24 are welded to the central portion of the U-shaped rod 18 which defines the intersection of the bottom wall 12 and the side wall 17. The bar 25 is disposed centrally between the adjacent legs of the two centrally positioned rods 19, and a respective lateral edge of the bar 25 is welded along its length to the adjacent metal rod 19.

Provided on the side wall 17 of the seat assembly 11 is a mounting assembly, designated generally by the reference numeral 26. The mounting assembly 26 comprises a leveling assembly, designated generally by the reference numeral 27, and mounting hooks, designated generally by the reference numeral 28 and described in more detail hereinafter.

Figure 2:
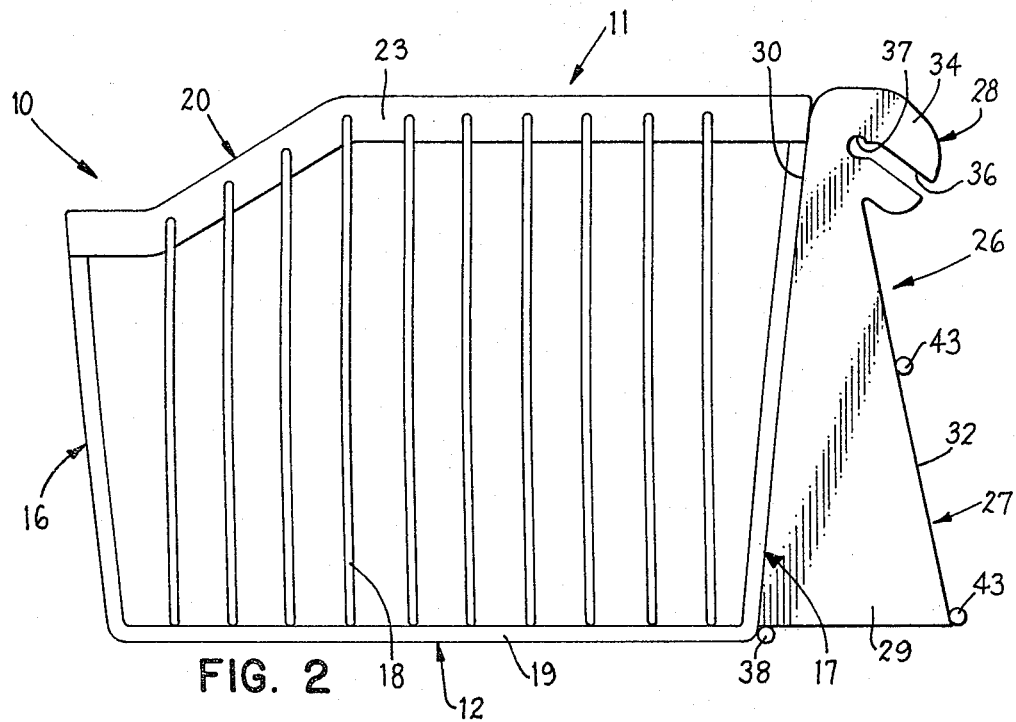
FIG. 2 is a view of one side of the baby carrier of FIG. 1.

The leveling assembly 27 comprises a pair of planar spacer members 29 which are horizontally spaced and have lower portions shaped substantially like isosceles triangles. One edge 30 (FIG. 2) of each spacer member 29 is disposed against and extends along a leg of a U-shaped rod 19, and each spacer member 29 is supported by hinges 31 (FIG. 1) for pivotal movement with respect to the seat assembly 11 about an axis defined by the edge 30. The hinges 31 may be attached to the spacer member 29 and the rod 19 in any convenient manner, preferably by welds. Each spacer member 29 is pivotally movable between a retracted position in which the spacer member 29 is disposed against the wall 17 of the seat assembly 11 in a generally parallel relationship therewith, illustrated by the upper baby carrier 10 in FIG. 4, and a leveling position in which the spacer member 29 is perpendicular to the wall 17 and defines a substantially vertically upright plane, as illustrated in FIG. 1. When the spacer member 29 is in the leveling position, a second edge 32 thereof is disposed at an incline with respect to the edge 30 so as to converge upwardly therewith. The edge 32 serves a purpose described in more detail hereinafter.

In the preferred embodiment of FIG. 1, the mounting hooks 28 of the mounting assembly 26 are provided as an enlarged coplanar extension 34 at the upper end of each spacer member 29. An upwardly inclined slot 36 extends inwardly from an outer edge of the extension 34 and terminates in a small upward detent 37.

A brace rod 38 extends along the intersection of the bottom wall 12 and the side wall 17 and is welded to each of the U-shaped rods 19 to give added strength and rigidity to the side wall 17 which supports the mounting assembly 26.

The leveling assembly 27 also comprises a bearing rod support member 41, one end of which is mounted by a hinge 42 to the rim 23 of the seat assembly 11 intermediate the spacer members 29 for pivotal movement about a substantially horizontal axis. A bearing rod 43 is welded to the opposite end of the support member 41 at a right angle thereto, and another bearing rod 43 is welded to the support member 41 at a right angle thereto and intermediate the ends thereof. Each bearing rod 43 is slightly longer than the distance between the spacer members 29 in their leveling position, such that the ends of each bearing rod 43 rest against respective edges 32 of the spacer members 29 when the spacer members 29 are in the leveling position, which position of the support member 41 and the bearing rods 43 is also designated a leveling position. In this position, the bearing rods 43 effectively define an inclined surface which converges upwardly with respect to the side wall 17.

Figure 4:
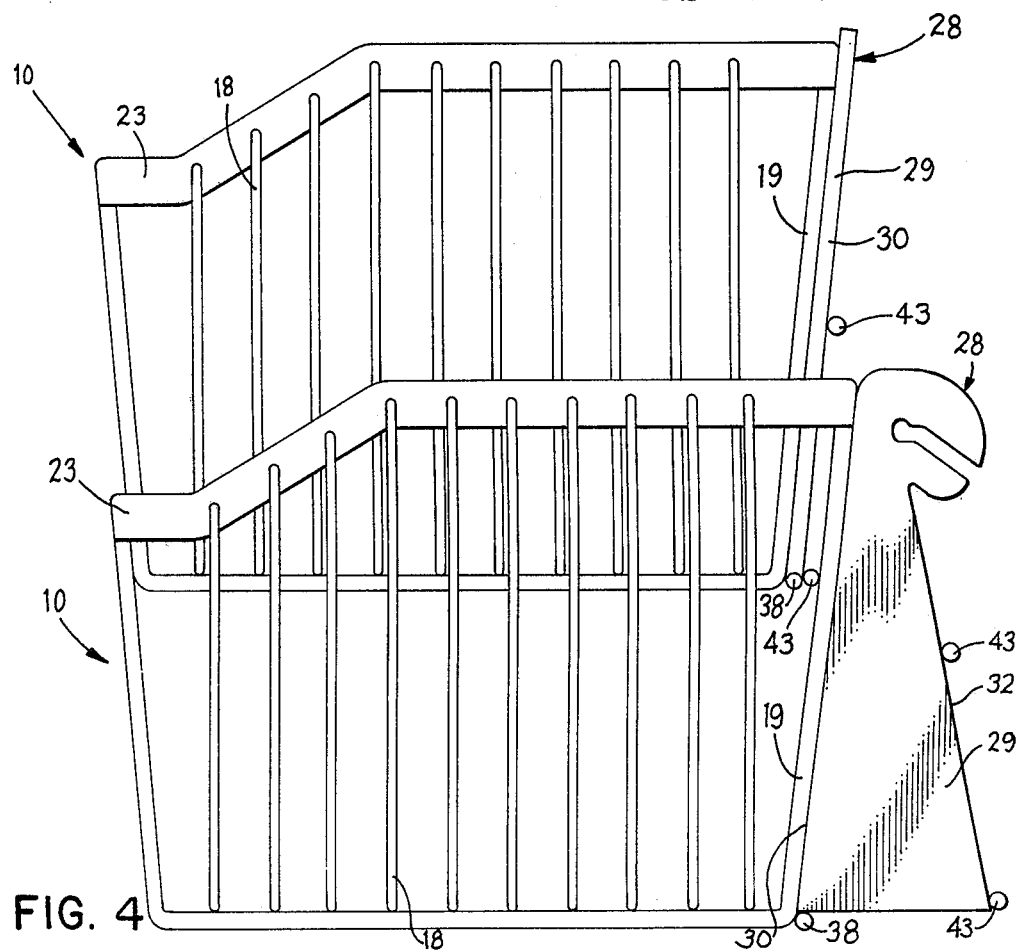
FIG. 4 is a side view of two baby carriers which are nestedly stacked.

When the spacer members 29 have been pivoted to their retracted position, the support member 41 is pivotally movable about the axis of the hinge 42 from its leveling position, illustrated in FIG. 1, inwardly to a retracted position in which the support member 41 is disposed against the side wall 17 and generally parallel thereto and the bearing rods 43 are disposed against the retracted spacer members 29, as illustrated by the upper baby carrier 10 in FIG. 4.

The hinges 31 are preferably constructed so that the spacer members 29 can pivot freely between the retracted and the leveling position, but cannot pivot past the leveling position. An inwardly projecting stop 44 (FIG. 1) is provided on the lower bearing rod 43 adjacent each end thereof to hold the corresponding spacer member 29 in its leveling position and to prevent an inadvertent movement thereof to the retracted position when in use.

When the spacer members 29 and support member 41 are each in a leveling position or in a retracted position, the mounting assembly as a whole is respectively said to be in a leveling or retracted position.

As illustrated in FIG. 4, the capacity of the mounting assembly 26 to be moved to the retracted position of parallel relation to the side wall 17, coupled with the downward convergence of the side walls 13, 14, 16 and 17, permits the carrier 10 to be stacked in a nested manner with one or more similar units.

Figure 5:
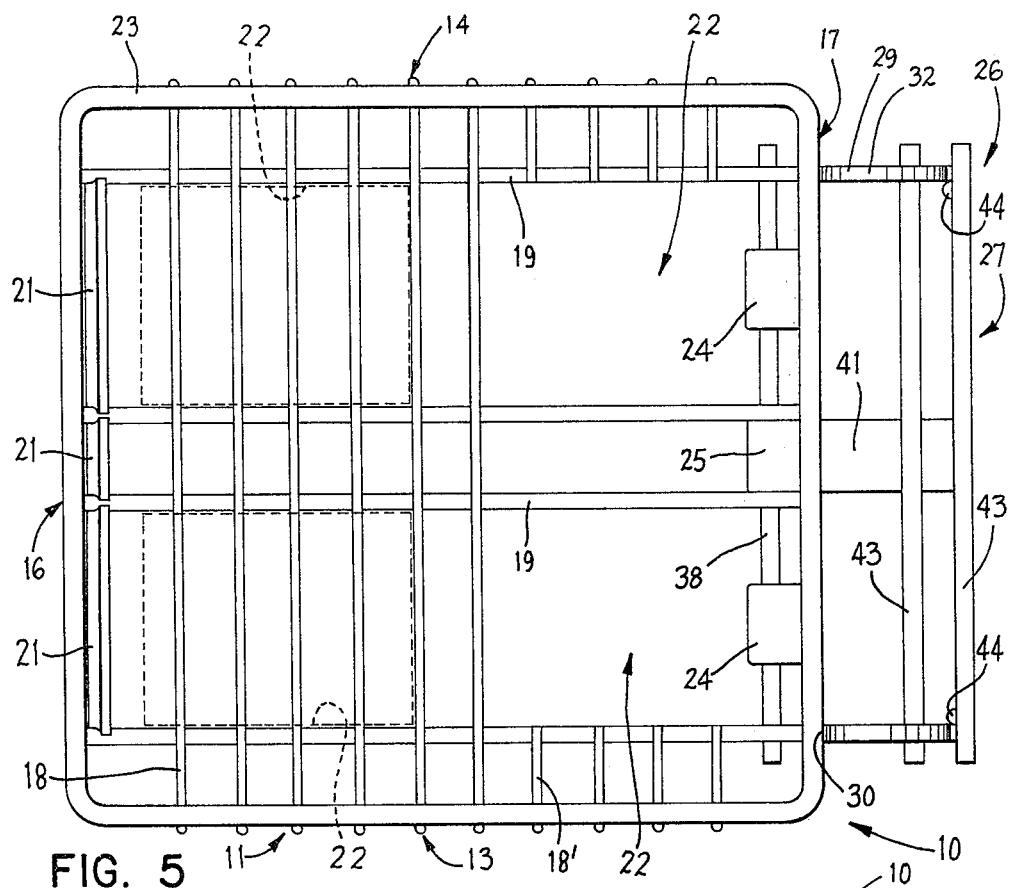
FIG. 5 is a top view of an alternative embodiment of the baby carrier of FIG. 1.
Figure 6:
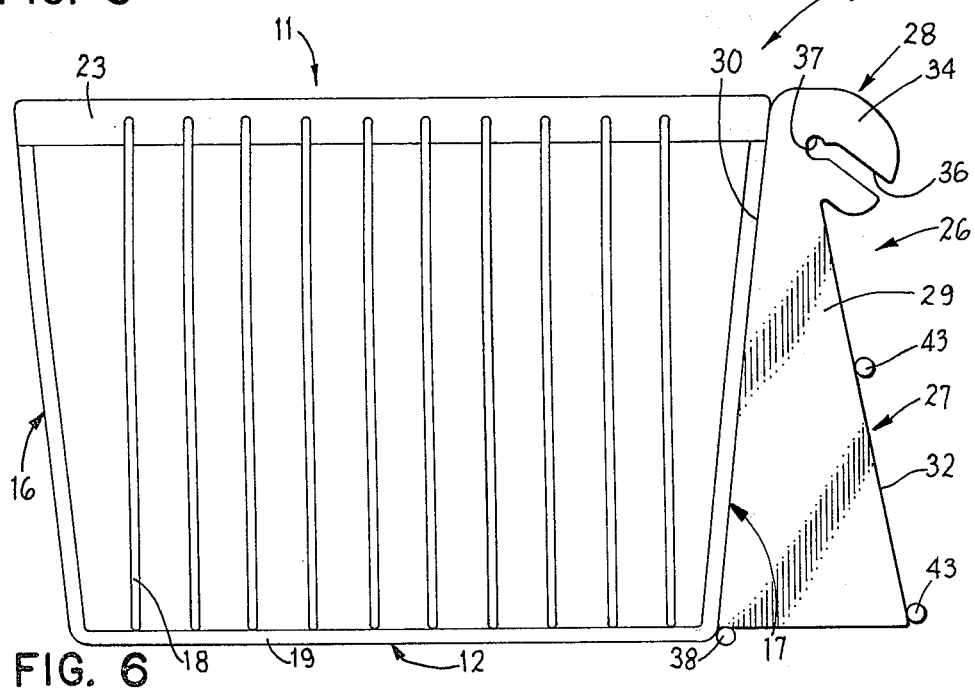
FIG. 6 is a side view of the baby carrier of FIG. 5.

The alternative embodiment of the invention illustrated in FIGS. 5 and 6 is identical in most respects to the embodiment described hereinabove and the reference numerals used in connection therewith are therefore used in FIGS. 5 and 6 to designate equivalent parts of the alternative embodiment. There are, however, two major differences.

First, the leg openings 22 are provided in the bottom wall 12 adjacent the side wall 17, as best shown in FIG. 5. This is achieved by eliminating the central portion of the four U-shaped rods 18 closest to the side wall 17 so as to leave only the legs of these rods, designated by the reference numeral 18'. With the central portion of these four U-shaped rods omitted, the brace rod 38 is particularly important in providing strength and rigidity to the side wall 17 which supports the mounting assembly 26. Since the central portion of the adjacent U-shaped rod 18 has been omitted, the lower end of the bars 24 cannot be welded thereto and they are instead preferably welded to the brace rod 38. Alternatively the leg opening can be provided adjacent the side wall 16 as shown in broken lines in FIG. 5. This will position child so that it will be faced forwardly but its legs will be protected by the frame structure of the baby seat.

The second major distinction between the embodiment first described and the embodiment of FIGS. 5 and 6 is that the side walls of the latter are all of substantially the same height.

OPERATION

Although the operation of the apparatus described above will be understood by persons skilled in the art from the foregoing description, a brief summary of such operation is now given for convenience.

Although the baby carrier 10 can be used with a number of different types of wheel-supported vehicles and for a number of purposes, the description of operation which follows will describe how it would be utilized in connection with a typical shopping cart and is applicable to both of the disclosed embodiments of the invention.

To detachably mount a baby carrier 10 on the shopping cart, the shopper would first pick up a carrier 10, typically from the top of a nested stack like the one illustrated in FIG. 4. Alternatively, the shopper may own a carrier and bring it to the store for use on the shopping cart. When removed from the nested stack, the spacer members 29 and the support member 26 will be in the retracted position as illustrated by the upper basket in FIG. 4. The shopper then rotates the support member 41 (FIG. 1) away from its retracted position to a position slightly past its leveling position and pivots each spacer member 29 away from its retracted position until the hinges 31 prevent further rotation, at which point the spacer members 29 are in the leveling position. The support member 41 is then pivoted back toward the side wall 17 until the ends of the bearing rods 43 are resting against the inclined edges 32 of the spacer members 29, as illustrated in FIG. 1. The inwardly projecting stops 44 prevent the spacer members 29 from inadvertently moving toward the retracted position.

The shopper then attaches the carrier 10 to the fixed front wall of a shopping cart by inserting the metal rod at the top of the fixed front wall of the cart into the inclined slots 36 in the mounting hooks 28 until the rod is received in the detent 37 at the end of the slot 36 and the bearing rods 43 are bearing against the vertical metal rods defining the front wall of the cart. The angle of inclination of the edges 32 of the spacer members 29 with respect to a vertical reference is designed to be substantially equivalent to the angle of inclination of the front wall of the shopping cart, such that when the carrier 10 has been detachably mounted on the front wall of the cart in the foregoing manner, the spacer members 29 and the bearing rods 43 will level the level 10, maintaining the bottom wall 12 in a generally horizontal position. Care must be exercised by the shopper to make sure that the shopping cart does not have a pivotal front wall construction.

The shopper may now slip the legs of a child through the leg openings 22 and seat the child on the bottom wall 12 of the seat assembly 11. Alternatively, the shopper can utilize the carrier 10 to hold items to be purchased, thereby augmenting the capacity of the cart for holding items to be purchased.

When the shopper is ready to leave the store, the carrier 10 can be removed from the shopping cart and returned to nested storage within a stock of similar carriers by reversing the order of the operational steps described above.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A baby carrier detachably mountable on a wheel-supported vehicle, comprising a seat assembly having downwardly converging side walls, a bottom wall extending between the lower edges of said side walls, and a pair of horizontally spaced leg openings in one of said walls; means for detachably supporting said baby carrier on said wheel-supported vehicle; and leveling means for maintaining said bottom wall substantially horizontal when said baby carrier is detachably supported on said wheel-supported vehicle, including at least one bearing member supported for movement between a retracted position adjacent one said side wall of said seat assembly for facilitating nested stacking of said baby carrier with similar carriers and a leveling position spaced from said one side wall for effecting said leveling of said bottom wall, and including spacer means cooperable with said one side wall and said bearing member for maintaining said bearing member and said one side wall in said spaced relationship when said bearing member is in said leveling position, said spacer means including a pair of horizontally spaced spacer elements, each supported on said one side wall for pivotal movement about an axis parallel to and adjacent said one side wall between a retracted position disposed against said one side wall generally parallel thereto and a leveling position substantially perpendicular to said one side wall; wherein said bearing member is a substantially horizontal rod; and wherein said spacer elements each have a portion of substantially triangular shape having one edge disposed against said one side wall coincident with said pivot axis and a second edge converging upwardly therewith, and including two said bearing members and a support member having one end supported on the upper portion of said one side wall intermediate said spacer elements for pivotal movement about a substantially horizontal axis, said bearing members being parallel to each other and perpendicular to said support member and being rigidly mounted to said support member at locations spaced from each other and from said one end, said bearing members being disposed against said second edges of said spacer elements when said spacer elements and said bearing members are in said leveling position, and one of said bearing members having means thereon for maintaining said spacer elements in said leveling position when said bearing members and said spacer elements are in said leveling position.

2. The baby carrier according to claim 1, wherein said means for detachably supporting said baby carrier on said wheel-supported vehicle includes a pair of hooks, each said hook comprising a coplanar extension of a said spacer element at the top thereof having an inclined slot therein extending upwardly from an outer edge of said extension and terminating in an upward detent.

3. The baby carrier according to claim 2, wherein said leg openings are in said bottom wall adjacent said one side wall.

4. The baby carrier according to claim 2, wherein said leg openings are provided in one of said side walls.

5. In a baby carrier which is detachably mountable on a wheel-supported vehicle, including a seating assembly having means defining a bottom wall and means defining a side wall extending upwardly from a peripheral edge of said bottom wall, mounting means provided on said side wall of said seating assembly for detachably supporting said seating assembly on said wheel-supported vehicle, and leveling means for maintaining said bottom wall in a level position when said seating assembly is supported on said wheel-supported vehicle, the improvement comprising wherein said leveling means includes an elongate, approximately horizontally extending bearing member, means supporting said bearing member for movement between a retracted position and a leveling position respectively adjacent and spaced from said side wall of said seating assembly, and spacer means cooperable with said side wall and said bearing member for maintaining said bearing member and said side wall in said spaced relationship, said spacer means including a pair of horizontally spaced spacer elements, each said spacer element being supported on said side wall for pivotal movement between a retracted position adjacent and extending along said side wall and a leveling position projecting outwardly from said side wall, said bearing member engaging each said spacer element at a location thereon remote from said side wall when said spacer elements are in said leveling position.

6. The baby carrier according to claim 5, wherein said spacer elements are each a platelike member which is pivotal about a respective axis extending upwardly along said side wall and each include a portion of substantially triangular shape having one edge disposed adjacent said side wall substantially coincident with the associated axis and a second edge converging upwardly with respect to said one edge; including two said bearing members; and including an elongate support member having one end supported on an upper portion of said side wall intermediate said spacer elements for pivotal movement about a substantially horizontal axis, said bearing members being parallel to each other and fixedly secured to said supoort member at locations thereon which are spaced from each other and from said one end thereof, said bearing members being disposed against said second edges of said spacer elements when said spacer elements and said bearing members are in said leveling position, and one of said bearing members having means thereon for maintaining said spacer elements in said leveling position when said bearing members and said spacer elements are in said leveling positions.

7. The baby carrier according to claim 5, wherein said mounting means includes a pair of hooks, each said hook being defined by a coplanar extension of a said spacer element at the top thereof which has an inclined slot therein which extends upwardly from an outer edge of said extension and terminates in an upward detent.

8. The baby carrier according to claim 7, including means defining leg openings in said bottom wall.

9. The baby carrier according to claim 7, including means defining leg openings in said side wall at a location spaced from said mounting means and leveling means.

10. The baby carrier according to claim 7, wherein said side wall extends completely around said bottom wall.

* * * * *